United States Patent [19]

Mallart

[11] Patent Number: 5,184,623
[45] Date of Patent: Feb. 9, 1993

[54] METHOD OF AND APPARATUS FOR THE EXAMINATION OF OBJECTS BY ULTRASONIC ECHOGRAPHY

[75] Inventor: Raoul Mallart, Paris, France

[73] Assignee: U.S. Philips Corp., New York, N.Y.

[21] Appl. No.: 708,942

[22] Filed: May 31, 1991

[30] Foreign Application Priority Data

Jun. 1, 1990 [FR] France .............................. 90 06852
Jan. 18, 1991 [FR] France .............................. 91 00558

[51] Int. Cl.$^5$ .............................................. A61B 8/00
[52] U.S. Cl. .............................................. 128/661.01
[58] Field of Search ...................... 128/660.01, 660.02, 128/660.05, 661.01; 73/602, 625–626

[56] References Cited

U.S. PATENT DOCUMENTS 4,471,785  9/1984  Wilson et al. ................... 128/661.01
4,817,614  4/1989  Hassler et al. .................. 128/660.05

FOREIGN PATENT DOCUMENTS

0320303  6/1987  European Pat. Off. .

Primary Examiner—Francis Jaworski
Attorney, Agent, or Firm—Jack D. Slobod

[57] ABSTRACT

A method of examining objects by ultrasonic echography, comprising a step for transmitting ultrasonic signals to the object to be scanned, and a step for receiving and processing echographic signals returend to the transducer elements by the object being examined, including focusing of the signals by application of an appropriate delay rule, and a revelant apparatus. The receiving and processing, step includes a step for two-by-two correlation of the n signals available after focusing in the receiving mode in order to determine $(n-1)$ focusing delay correction values, followed by a step for correcting, as a function of the $(n-1)$ values, the focusing delays during the next activation and, in accordance with the invention, a step for correcting, as a function of the $(n-1)$ values, focusing delays in the receiving mode during the same activation.

15 Claims, 6 Drawing Sheets

METHOD OF AND APPARATUS FOR THE EXAMINATION OF OBJECTS BY ULTRASONIC ECHOGRAPHY

FIELD OF THE INVENTION

The invention relates to a method of examining objects by ultrasonic echography.

For carrying out this method, the invention also relates to an apparatus for examining objects by ultrasonic echography.

Such method and apparatus can be used notably in the medical field, or for the non-destructive testing of any type of material, but the invention is not restricted to such application.

BACKGROUND OF THE INVENTION

An echography apparatus is an apparatus for examining objects which utilizes ultrasonic radiation as an information source. The operation of such an apparatus involves a transmission step during which ultrasonic signals are periodically applied to the medium being examined, as well as a receiving and processing step for the echos returned by the obstacles encountered in the object being examined. The two steps are executed by means of the same ultrasonic probe in contact with the object. This probe consists of a structure which is generally composed of a complete array of ultrasonic transducers.

During the transmission step the object is selectively scanned along a line. During reception, the image of the scanned line is formed, taking into account the transit time in the object and the amplitude of the echos stemming from various obstacles encountered along the line. The image of a slice is formed by scanning of such a line. In order to obtain a suitable image resolution, attempts are made to scan the object in a very selective manner by way of a focused ultrasonic activation and, upon reception, to select the echos stemming from the same line by using a focusing aperture.

A contemporary focusing technique comprises the use of a linear array of transducers and of defining, upon transmission, a focused incident beam by means of a delay rule imposed on the transducer excitation pulses. Upon reception, focusing is realized in a similar manner by suitably delaying the signals received by each of the transducers of the array before carrying out the summing and further processing of these signals. This processing of the signals in the receiving mode, resulting in a signal having a high amplitude for the echos stemming from the focusing point (which point is situated on the line scanned) and in weak signals for all other echos, is customarily referred to as "channeling". In order to achieve suitable focusing for a complete line, contemporary echography apparatus utilizes a focusing rule in the receiving mode which varies quickly as a function of time so as to be adapted to the echos received at any instant. This possibility arises from the existence of a univocal relation between the time and the depth in echography so that the echos returned by remoter structures arrive later. Actually, for the sake of simplicity, the variation of the receiving focus generally is not continuous but varies in zones. The determination of focusing delay rules is realised by application of various geometrical considerations, notably by assuming that the propagation speed of sound is constant in the object being scanned. For efficient focusing, the delays applied should also have a precision of one eighth of the wavelength; for example, for a probe having a central frequency 5 MHz, the delays must be variable in steps of 25 ns (=200 ns/8).

The use of linear arrays of transducer elements enables not only focusing but also the scanning necessary for forming a two-dimensional image. Scanning can be performed in at least three different ways which are described with reference to FIG. 1a to 1d which show different types of probe with the respective acoustic apertures A used, the axes B of the beams formed, and the boundaries D of the field examined.

The first and most simple solution (see FIG. 1a) comprises the use of an array of one hundred (or more) transducers (currently, 128 transducers are used). Thus, a transmission/reception aperture is defined which has a given width (typically from 16 to 64 elements) and which focuses along an axis extending perpendicularly to the array in the transmission mode as well as the receiving mode. Scanning is realized by displacing the aperture by analog multiplexing. Two successive apertures thus defined have an intersection which constitutes the entire aperture except for one or a few transducer elements. This mode of operation enables images to be obtained of a zone of the object situated in the geometrical shade of the probe.

According to the other two scanning techniques, all elements of the probe are used for all lines of the image. These probes at present comprise 64 or 128 elements. In one of these two modes (see FIG. 1b) the focusing rules are calculated so as to form lines perpendicularly to the array. In this case the zone of the object scanned is again situated in the shade of the probe. The importance of this mode resides in the use of all elements, that is to say large apertures, enabling a higher resolution to be achieved.

The other mode (see FIG. 1c) is used notably to obtain images of zones which are larger than the imprint of the probe on the object. The delay rules for transmission and reception are calculated so that the ultrasonic beam can enclose an arbitrary angle with respect to the axis of the probe. The image is obtained by the scanning of an angular sector (commonly from −45 to +45 degrees). Such systems, referred to as phased arrays, notably enable images to be formed of the heart in medical applications, i.e. through the acoustic window formed by one of the intervals between the sides.

Other types of probe also exist, which types utilize, for example curved linear arrays (see FIG. 1d) capable of emitting ultrasonic beams perpendicularly to their tangent, thus also enabling an image to be obtained of the object in a zone which is larger than their imprint.

The purpose of an echography apparatus being the formation of images, processing of the signals obtained after the channeling is necessary. This operation takes place in two principal steps: on the one hand, an envelope detection which extracts the amplitude information from the signal formed, and on the other hand a scan conversion which reconstructs the image on the basis of time information contained in the envelopes of the signals and the position of each line relative to the probe.

Figure 1A:
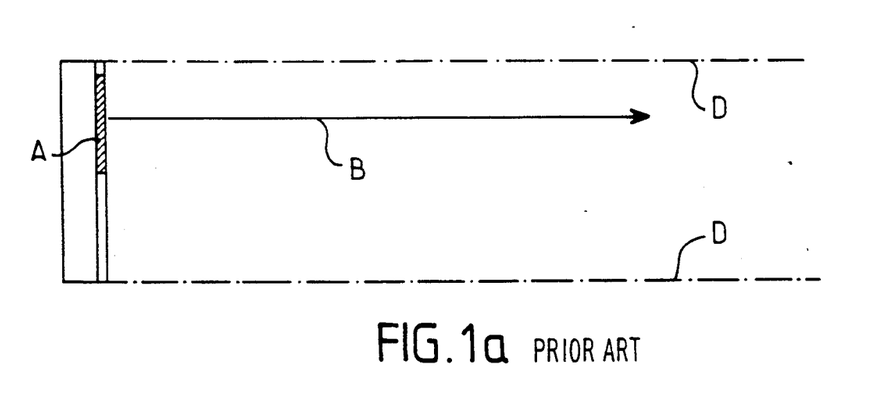
FIGS. 1a to 1d show different types of ultrasonic probe configurations suitable for use in ultrasonic echography.
Figure 1B:
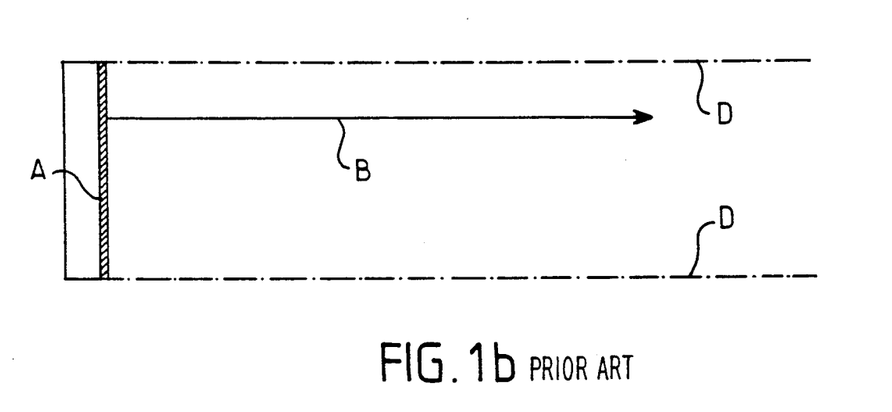
Figure 1C:
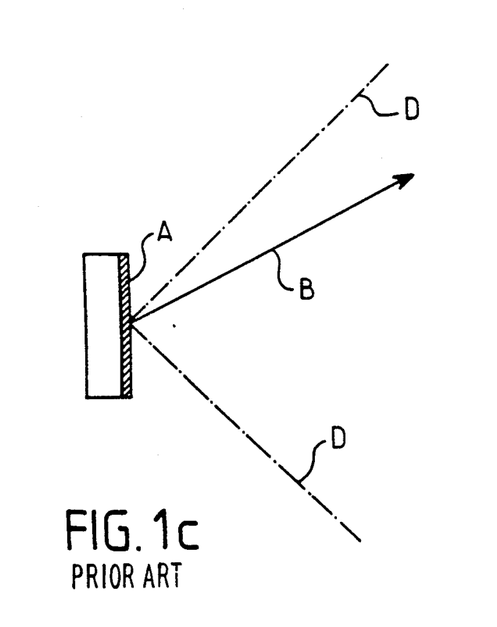
Figure 1D:
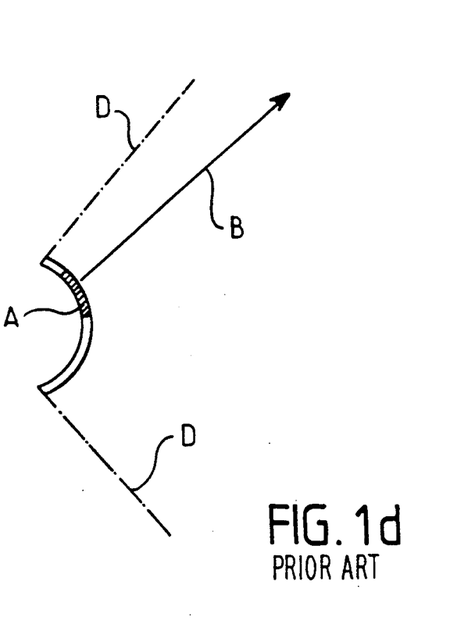
Figure 2A:
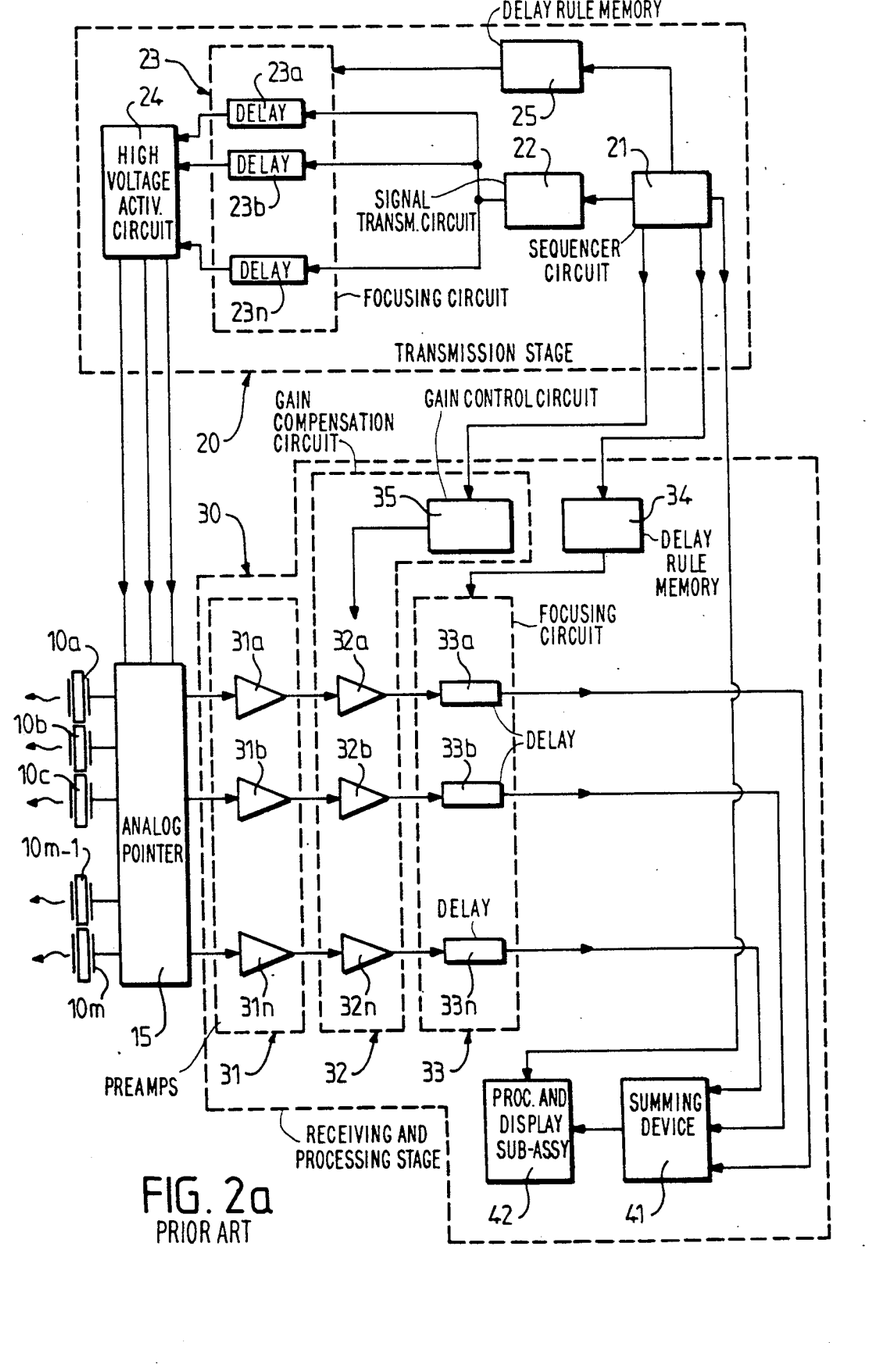
FIGS. 2a and 2c show two embodiments of a conventional echography apparatus, FIG. 2b showing an embodiment of the processing and display sub-assembly for said two embodiments.

This general summary of the operation of a conventional echography apparatus enables definition of the general structure as proposed in FIG. 2a. The echography apparatus shown therein comprises first of all an array of m ultrasonic transducers 10a to 10m which are connected to an analog pointer 15 which enables definition of the aperture. The other extremity of this pointer 15 is connected on the one hand to a transmission stage 20 and on the other hand to a receiving and processing stage 30.

Generally speaking, the transmission stage 20 comprises the following elements:

(a) a sequencer circuit 21 which defines the rhythm of the ultrasonic activations with a recurrent frequency in the order of, for example from 3 to 5 kHz, and which comprises essentially an oscillator and a frequency divider which supplies the necessary different clock signals;

(b) an excitation signal transmitting circuit 22 which is connected to the output of the sequencer circuit 21 and which serves to transmit electrical signals for excitation of the transducers, which excitation is controlled either according to a time rule appropriate to enable focusing of the ultrasonic signals, or is phase controlled, the different focusing delays thus being obtained (which is the case shown in FIG. 2a) by means of n delay lines 23a to 23n which are connected to the output of the circuit 22, or in the n transmission channels associated with the n transducers used for the transmission (n smaller than m), respectively;

(c) if the focusing is not realized by the circuit 22 (as indicated sub (b)), the n delay lines 23a to 23n constitute an electronic focusing circuit 23;

(d) a circuit 24 for activating the high voltage, delivering the high-voltage pulses for execution of the transmission by the transducers.

The sequencer circuit 21 supplies not only the synchronization pulses for the ultrasonic activations, but also the control signals for a delay rule memory circuit 25 for controlling focusing in the transmission mode. This circuit 25 comprises a memory containing the sequence of delay rules in the transmission mode for each transducer, which sequence serves to achieve the configuration of the delay lines 23a to 23n of the focusing circuit 23 according to a predefined rule for each activation.

The receiving and processing stage 30 consists first of all of n receiving and processing channels which comprise the following elements in the present embodiment:

(a) preamplifiers 31a to 31n, the group of n preamplifiers constituting a preamplifier circuit 31 which receives the n echographic signals corresponding to the aperture of the transducer array;

(b) a circuit 32 for gain compensation as a function of time;

(c) delay lines 33a to 33n, the group of delay lines constituting a circuit 33 for focusing in the receiving mode (dynamic focusing).

The gain compensation circuit 32 essentially comprises n amplifiers 32a to 32n whose gain is variable as a function of time and which are controlled by a control circuit 35 which itself receives synchronization pulses from the sequencer circuit 21. The circuit 33 for focusing in the receiving mode is connected to a memory 34 which stores, for each channel, the set of delay rules for each focusing zone and for each line of the image; the memory 34 itself is also controlled by the sequencer circuit 21.

Figure 2B:
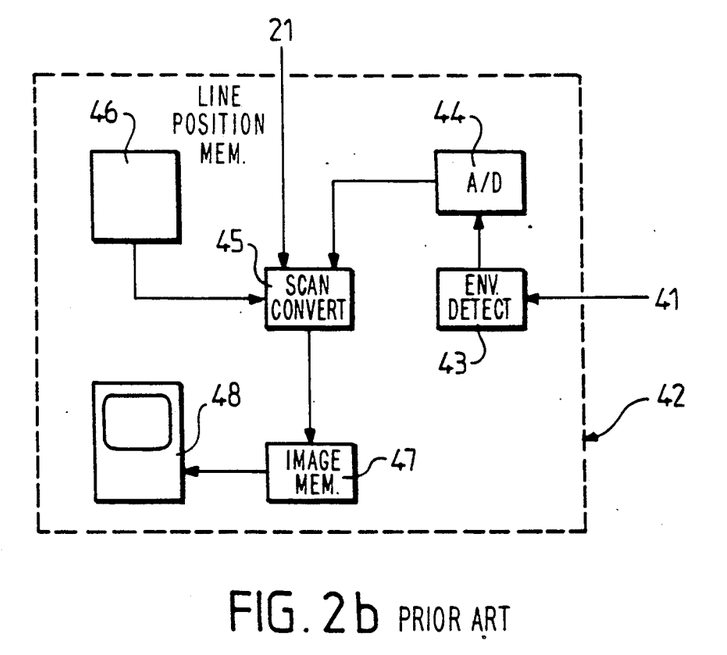

A summing device 41 thus receives the output signals of the n receiving and processing channels thus formed (actually, the output signals of the circuit 33), and is followed by known circuits which enable images of slices of the object scanned to be obtained. This group of circuits, collectively denoted by the term "processing and display sub-assembly 42" and shown in FIG. 2b, essentially comprises:

an envelope detector 43 which receives the output signal of the summing device 41 and which is followed by an analog-to-digital converter 44;

a scan converter 45 which receives on the one hand the output signal of the analog-to-digital converter 44 and on the other hand the output signal of a memory 46 which defines the positions of the lines scanned with respect to the probe, and also receives synchronization signals which are again supplied by the sequencer circuit 21;

an image memory 47 which serves as a buffer memory for the output signals of the scan converter 45 and whose output signals are themselves displayed on a display screen 48 after the reading of the memory.

It is to be noted that this summary of the configuration of a conventional echography apparatus is a general summary and that various modifications also merit mentioning, notably those which relate to the digital processing of the signals in the receiving mode (or the formation of the channels) by inserting, for example an analog-to-digital converter at the output of the circuit 32 for gain compensation as a function of time. One improvement encountered in given high-end echography apparatus consists, as appears from the embodiment shown in FIG. 2c, in the distribution of the gain compensation as a function of time between two distinct gain compensation circuits 321 and 322; one of these circuits is arranged at the output of the circuit 31 as before and upstream from the circuit for focusing in the receiving mode in order to perform a first gain compensation which already allows for elimination of most noise, the other circuit being situated downstream from the circuits providing focusing and summing, just ahead of the sub-assembly 42, in order to impart a finer, complementary compensation.

Figure 2C:
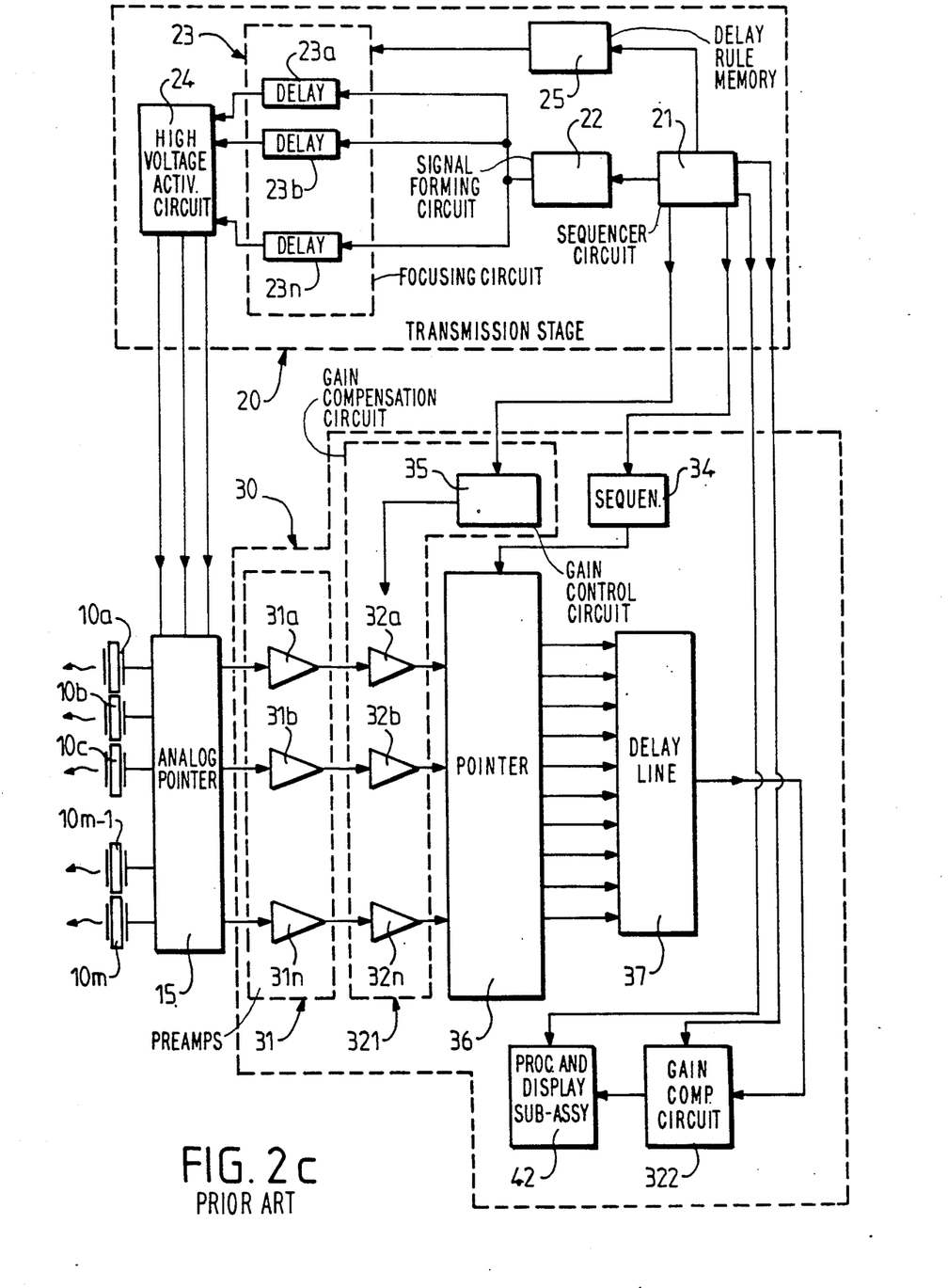

The focusing and summing functions, however, can also be realized in a way other than described thus far by utilizing, as is shown in FIG. 2c, a pointer 36 and a single delay line 37. The pointer 36 is controlled by the sequencer 341 which is connected to the output of the circuit 21 as before and comprises as many inputs as there are transducers present in the aperture and as many outputs as there are possible delays. These outputs are connected to different input points of the delay line 37. The pointer 36 receives the output signals of the gain compensation circuit 321, converts the signals into a current and subsequently directs each signal thus formed to the output which corresponds to the desired delay. Summing is realized by natural addition of the currents entering the delay line 37.

The operating principle of contemporary echography apparatus is generally based on the hypothesis of a constant ultrasonic speed in the tissues scanned, notably to enable calculation of the various focusing delays and any angulation of the beams and to enable conversion of information concerning the transit times of echos into depth information. However, this hypothesis is rarely verified: the propagation speed of ultrasonic waves, for example has a mean value of 1540 m/s in the liver, while in lipid tissues it amounts to approximately 1300 m/s. Consequently, during transmission as well as reception defocusing of the ultrasonic beams occurs, leading to a loss of resolution and contrast of the images, which loss is higher as larger focusing apertures and probes of higher frequency are used. The effect of the frequency on the degradation thus observed can be understood by considering the necessity of conserving a precision of the delays of approximately one eight of the wavelength, corresponding to a precision which is better as the frequency is higher, while the effect of the width of the aperture can be explained by observing that as the aperture is greater, the probability that zones of different speed of sound are encountered is greater.

One solution to reduce the interference resulting from such defocusing consists in the comparison by correlation of the echographic signals received by the various transducers and by subsequently delaying each of these signals before their combination and the execution of the operations as regards envelope detection, filtering and display. The proposed operation thus consists of a single correction, in the receiving chain and after the first activation, of the delays affecting each of the echographic signals received. European Patent Application EP 0 256 481, which corresponds to U.S. Pat. No. 4,817,614, describes an ultrasonic echography apparatus comprising an adaptive focusing device which utilises such a method. The cited document also describes how the method can be carried out.

SUMMARY OF THE INVENTION

It is the object of the invention to propose an improved method of correcting the effects of inhomogeneities of the ultrasonic speed.

To this end, the invention relates to a method as described above which is characterized in that the receiving and processing step also includes a step for correcting, as a function of said (n−1) values determined, the focusing delays in the receiving mode during the same activation.

This method offers the advantage that it enables the corrections to be carried out real-time in the ultrasonic echography apparatus.

Moreover, because the necessary delays are not necessarily the same for an image, an improvement of this method can be proposed where the receiving and processing step includes, prior to the focusing delay correction in the transmission mode, a shift of the aperture by a number of p transducer elements which is equal to 1 or small with respect to the number n, said correction being applied only to the (n−p) transducer elements common to two successive apertures.

When n=m, i.e. when all m transducer elements are always used, the shift of the aperture is not obtained by modification of the selection of the given number of n transducer elements, but by modification of the delay rule applied to the m transducers, and the correction step then concerns all these m transducers.

Thus, by using the delays estimated during the activation of one line for the correction of the next line, a single activation is required for each of the image lines; this is advantageous for the image rate. Thus, it is not necessary to perform iterative corrections on the same line, because they are automatically realised by correction propagation from one line to another. It is to be noted, however, that according to this method the first is not corrected; this can be remedied, for example by performing a supplementary activation for each image, which activation is carried out exclusively for the correction of said line. In the case of linear scanning where one transducer element in each aperture does not receive a correction, use can be made of the correction applied to the neighbouring transducer element because the fluctuations of the ultrasonic speed evolve only slowly for such small distances.

When a maximum resolution is desired over the entire scanning depth, it is useful to perform several activations per image line, be it at the expense of a reduction of the image rate. When it is also desirable to correct the ultrasonic speed fluctuations, different delays can be determined for each activation: the method then enables either two (or more) activations for each transmission focus, or the use of the corrections in cascade from one depth to another, and subsequently from one line to another, or the use (for each depth) of the delays determined for the preceding line at the same depth.

Finally, according to another version of the method the receiving and processing step comprises, prior to the correction of the focusing delays, an operation for detection of an anechoic zone in the medium scanned and/or detection of a linear component in the focusing delays. Actually, in all ultrasonic examination techniques aberrations are corrected on the basis of signals originating from a medium considered to be comparatively uniform, that is to say without targets which are substantially brighter than the remainder of the medium investigated or, to the contrary, without an anechoic zone. However, the tissues examined can often be highly non-uniform and the detection of these irregularities is very useful. When a bright target which is situated off the axis of the line explored returns echos which interfere with the signals to be correlated, the calculation of the correction delays is false, but the presence of a linear component in these delays enables detection of such a situation. The detection of an anechoic zone is possible, for example by comparing the amplitude of the signals received with the mean value across the image and by abstaining from modifying the correction delays in such a case.

The invention also has for its object to propose an apparatus for carrying out the described method.

To this end, the invention relates to an apparatus as defined in the preamble of the description, characterized in that the receiving and processing stage also comprises means for correcting, as a function of the (n−1) values determined, focusing delays in the receiving mode in the course of the same activation, the focusing delay correction means preferably comprising a sequencer for defining the appropriate focusing delay in each channel.

In a preferred embodiment of the invention, which comprises a scan control stage for shifting the ultrasonic aperture across the network of transducer elements, said control stage comprises means for shifting said aperture by a number of p transducer elements which is equal to 1 or small with respect to the number n, each focusing delay correction in the transmission mode being applied only after said shift and only to the (n−p) transducer elements common to two successive apertures. When n=m, said control stage comprises means for shifting the aperture by modification of the delay rule applied to the transducer elements.

Finally, in accordance with the invention said apparatus may also comprise means for interrupting the correction as a function of a predetermined criterion.

BRIEF DESCRIPTION OF THE DRAWING

The invention will be described in detail hereinafter with reference to the accompanying diagrammatic drawings. Therein.

DESCRIPTION OF THE PREFERRED EMBODIMENT

Conventionally, an examination of objects by ultrasonic echography comprises a transmission step with periodic activations by a network of m transducer elements, n of which are selected in order to constitute the ultrasonic aperture (n is generally smaller than m). This step for transmitting n ultrasonic signals to the object to be scanned is followed by a step for receiving and processing echographic signals returned to said n transducers by the obstacles encountered in the object. In the transmission mode as well as the receiving mode, focusing takes place by application of an appropriate delay rule in the n transmission channels and the n receiving channels associated with the n transducer elements constituting the ultrasonic aperture.

This receiving and processing step itself includes:
(a) a correlation step: according this step, upon reception of focused signals from transducers, the signals received are compared two-by-two by means of correlation devices; that delay among these signals which corresponds to the correlation maximum found than constitutes the delay correction value to be applied;
(b) a correction step: for the n focused signals corresponding to the aperture, (n−1) delay correction values are thus determined; on the basis thereof, the focusing delays can be corrected during the next activation.

In accordance with the invention, the receiving and processing step also includes, subsequent to the step (a), a correction step in the receiving mode during the same activation, said correction of focusing delays always being performed on the basis of the (n−1) correction values determined.

According to a further version of the method in accordance with the invention, the focusing delay correction step in the transmission mode is preceded by a shift of the aperture. When this shift is realised by shifting over a number of p transducer elements which is equal to 1 or small with respect to the number n (not exceeding, for example 1/10th of said values), said correction is applied exclusively to the (n−p) transducer elements common to two successive apertures. When the number n is equal to m, the aperture can be displaced by modification of the delay rule applied to the m transducer elements and the correction is applied to these m elements.

In a novel version of the method, the receiving and processing step during which, as indicated, an iterative correction is provided either in the transmission mode or in the transmission mode and in the receiving mode, may also include a time delay for interrupting the iterative correction process as soon as it is estimated, according to a predetermined criterion, that said correction is efficient and sufficient. The interruption criterion is, for example a check of the execution of a predetermined number of activations, or is based on a calculation of the energy of the echographic line.

A further version consists in the inclusion, prior to the correction of the focusing delays, of a step for the detection of an anechoic zone in the medium scanned and/or the detection of a linear component in the focusing delays.

Figure 3:
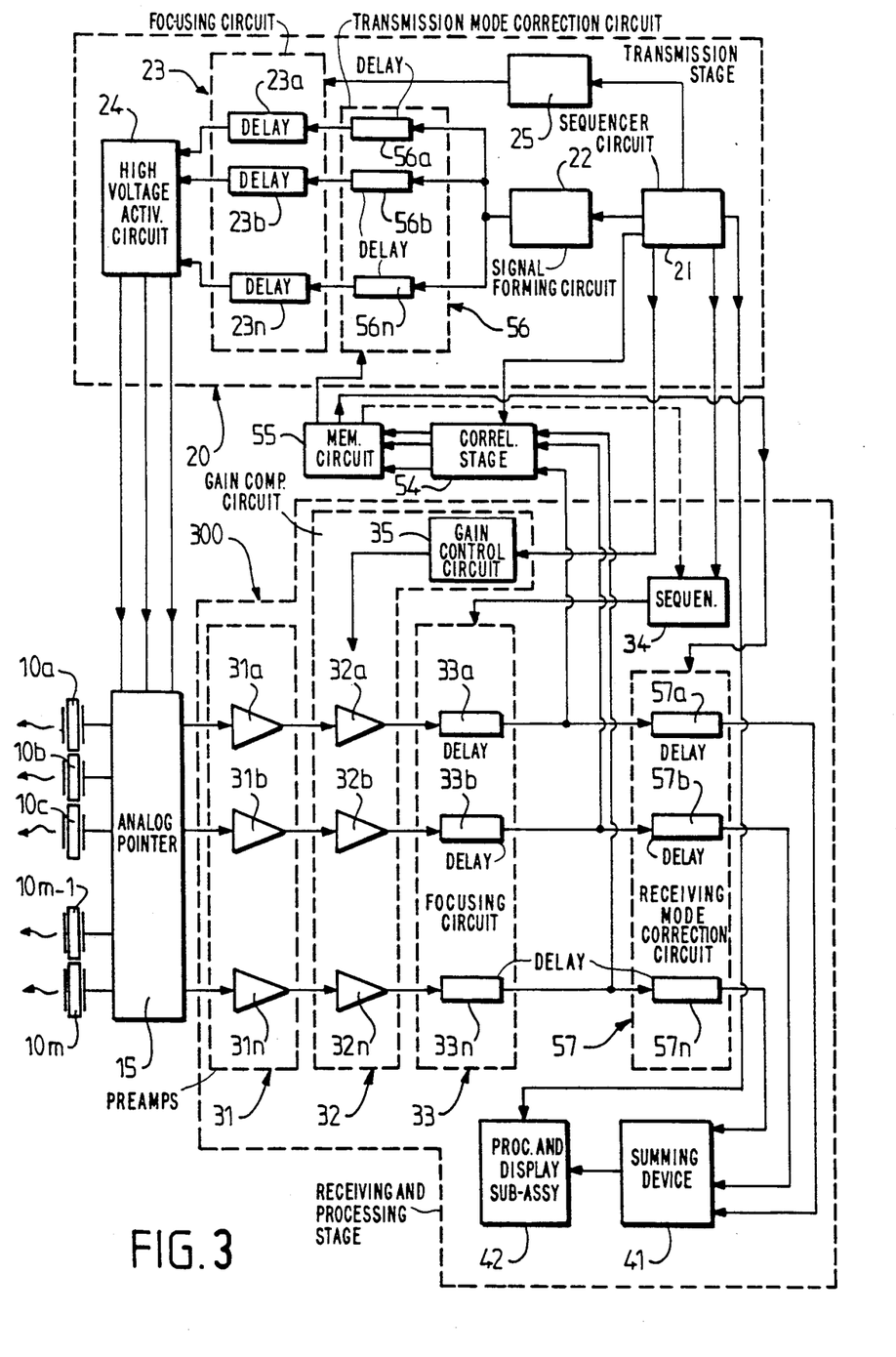
FIG. 3 shows an embodiment of an echography apparatus in accordance with the invention.

FIG. 3 shows an embodiment of the ultrasonic echography apparatus for carrying out the method in accordance with the invention. This apparatus comprises first of all, as before, a network of m ultrasonic transducers 10a to 10m which serve to transmit and receive ultrasonic signals, as well as an analog pointer 15. In the present embodiment the transducer network is linear, but this represents merely a non-limitative example. The transducer network may be two-dimensional, or of the type described, for example in French Patent Specification no. 2592720, without these other examples themselves being limitative.

The ultrasonic transmission is realised in periodic activations towards an object to be investigated (not shown), the transmitted signals being electronically focused in advance by excitation of the transducers according to a given time rule which imposes a distinct delay on each of said transducers. This transmission is realised by means of the transmission stage 20 which comprises the following elements:
(a) the sequencer circuit 21 which defines the rhythm of the ultrasonic activations;
(b) the circuit 22 for transmission of the electrical excitation signals for the transducers;
(c) if focusing has not been realised by the circuit 22, the electronic focusing circuit 23;
(d) the high-voltage activation circuit 24 for execution of the transmission by the transducers;
(e) the circuit 25 for controlling the focusing in the transmission mode.

The echographic signals returned to the transducers by the obstacles encountered in the object being scanned are received by a receiving and processing stage 300 which is composed of n receiving and processing channels which comprise the following elements in the present embodiment:
(a) the group of n preamplifiers 31a to 31n which constitute the preamplifier circuit 31;
(b) the circuit 32 for gain compensation as a function of time;
(c) the group of delay lines 33a to 33n which constitute the circuit 33 for focusing in the receiving mode, said circuit being controlled by the sequencer 342.

The summing device 41 receives the output signals of the n receiving and processing channels thus formed, and is followed by the processing and display sub-assembly 42. Parallel to the n receiving and processing channels, a correlation stage 54 receives a signal from the sequencer circuit 21 which defines a measurement time window. This stage 54 is shown in detail in FIG. 4a and in this case comprises n−1 correlation devices (in this case 1-bit correlation devices) which have two inputs and which are denoted by the references 54a to 54n−1; these devices are described in detail with reference to FIG. 4b which shows one of these correlation devices, for example the correlation device 54i.

Figure 4A:
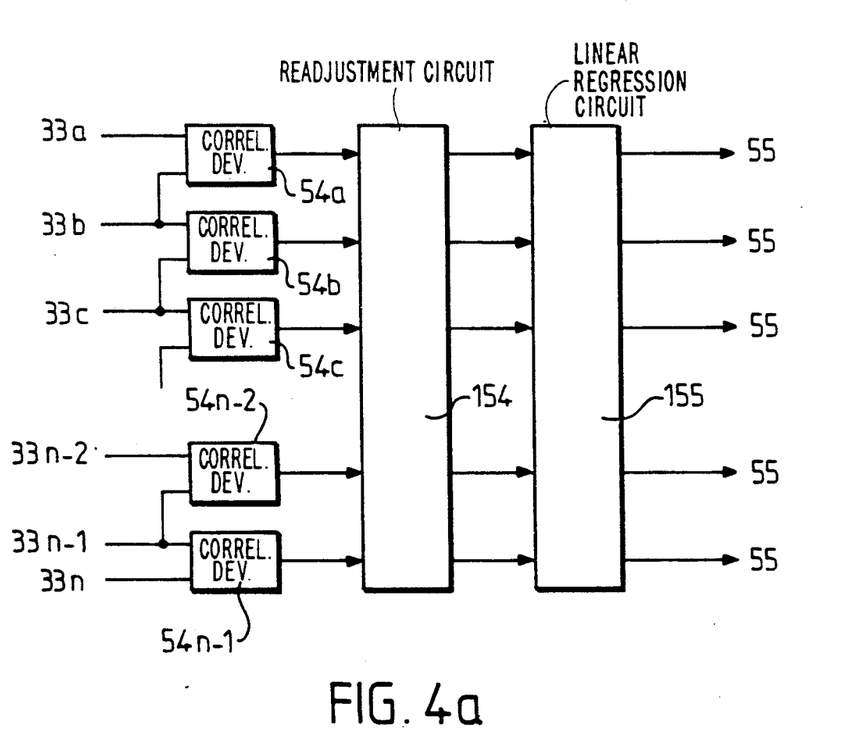
FIGS. 4a and 4b show an embodiment of the correlation stage of the echography apparatus of FIG. 3 and, included in this stage, one of the relevant correlation devices, respectively.
Figure 4B:
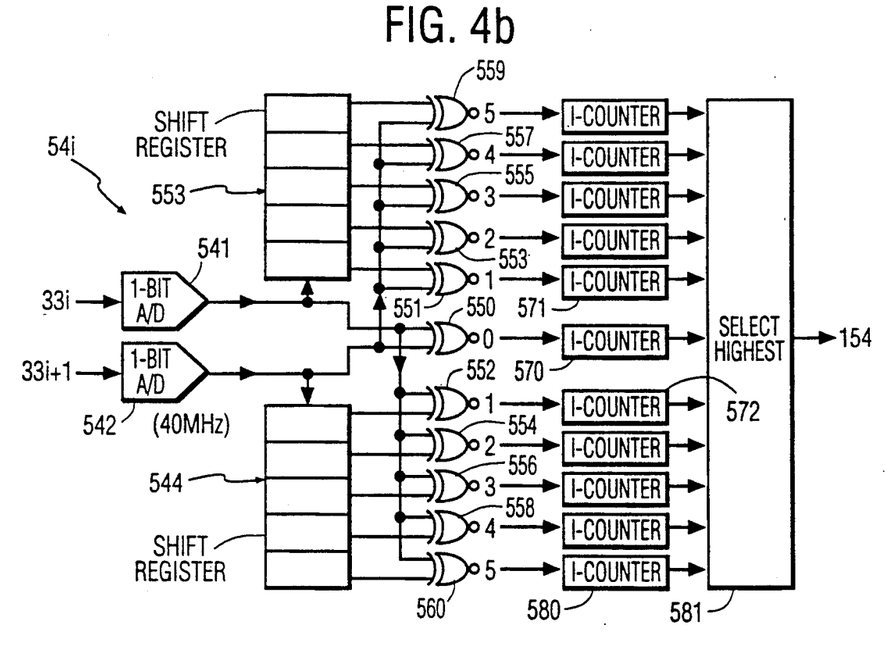

It is to be noted that the correlation devices in an integrated circuit are commercially available at present, for example the correlation device TDC 1023 marketed by TRW, La Jolla, CA. 92038, USA. In the present case, as indicated in FIG. 4b, the correlation device 54i, like each of the other n−2 other correlation devices, comprises first of all two 1-bit analog-to-digital converters 541 and 542, one of which receives the output signal of the $i^{th}$ delay line 33i while the other converter receives the output signal of the $(i+1)^{th}$ delay line 33i+1. The converters 541 and 542 are controlled by a clock frequency which amounts to from approximately 8 to 10 times the central frequency of the transducer network (for example, a clock frequency of 40 MHz), and are followed by shift registers 543 and 544, the shift register 543 being connected in series with the output of the converter 541 while the register 542 is connected in series with the output of the converter 542. The input of each register and the outputs of these registers are applied two-by-two to the two inputs of exclusive-NOR circuits, in this case numbering 11 and denoted by the references 550 to 560, in order to execute the following eleven comparison:

comparison of the non-delayed output signals i and i+1 in the circuit 550;
comparison of the output signal i+1 and the output signal i, successively, delayed by from one to five shift periods of the register 543 in the circuits 551, 553, 555, 557 and 559;
comparison of the output signal i and the output signal i+1, successively, delayed by from one to five shift periods of the register 544, in the circuits 552, 554, 556, 558 and 560.

Eleven 1-counters 570 to 580, provided in correspondence with the respective outputs of the exclusive-NOR circuits 550 to 560 and followed by a circuit 581 for selecting the highest of the output signals of these counters, enable estimation of the delay corresponding to the maximum correlation between the two echographic signals concerned. The number of shifts of the registers (in this case 5) and, consequently, the number of counters (in this case 11) depend on the clock frequency and the central frequency of the transducer network. When these frequencies relate as 8 to 10, five shifts are actually necessary and sufficient. If this ratio is, for example larger, more shifts will be required in order to preserve a precision in the order of one eighth of the wavelength for the correction delays.

Each correlation device thus enables estimation of the delay between two echographic signals dynamically focused during the first activation, focusing being executed as if there were no inhomogeneities in the object scanned. The group of (n−1) delay values supplied by the (n−1) correlation device selection circuits is then processed, as indicated in FIG. 4a, in a readjustment circuit 154 which readjusts these values with respect to a common reference (for example, with respect to the first channel, but this could alternatively be any other channel). The readjustment circuit 154 is in this case followed by a linear regression circuit 155 for the (n−1) readjusted values in order to suppress the linear tendency (due to the possible presence of targets outside the focusing axis). The order in which said readjustment and said suppression of the linear tendency are realised is merely given by way of example and may be changed. As regards the structure of the circuits it is also to be noted that, if the shift registers are derivatives of the correlation devices, a number of registers which is two times smaller can be provided without affecting the operating principle.

In the described embodiment, the (n−1) output signals of the circuit 155 constitute the output signals of the correlation stage 54. For the n receiving and processing channels considered, therefore, there are (n−1) delays which are preferably measured between the signals received by adjacent transducers in order to obtain the highest precision. The delays which are due to inhomogeneities to be corrected generally are comparatively small and, therefore, the correlations need be carried out merely for shifts in the order magnitude of approximately one half wavelength only, which justifies the use of merely registers comprising five cells for the correlation devices, taking into account the values of the clock frequency and the central frequency of the transducer network.

The delays thus estimated are stored in a memory circuit 55, after which they are introduced, prior to initialization of the next activtion, into the transmission channels by means of delay lines 56a to 56n which form a circuit 56 for correction in the transmission mode. This circuit 56 is arranged, for example just upstream from the electronic focusing circuit 23. A new transmission can then take place, which, for the focusing in the transmission mode takes into account the corrections thus made as regards the delays of each transmission channel. Upon reception of echographic signals corresponding to this new activation, the delays between the signals are again estimated by correlation as before, after which they are reintroduced into each transmission channel just before the next activation, and so on. Thus, these successive correlations result in an iterative correction of the inhomogeneities of the ultrasonic speed in the object scanned.

It is to be noted that the estimated delays, stored in the memory circuit 55, can be reintroduced not only into the transmission channels during the next activation, but also, again during said next activation, into the receiving and processing channels. This alternative is illustrated in FIG. 3 which shows, using broken lines, a supplementary connection between the circuit 55 and the sequencer 342 which then modifies, as a function of the stored delays, for each channel the delay enabling dynamic focusing in the receiving mode.

The modification of the dynamic focusing delays in the receiving mode can be carried out, as described herein, directly in the programmable focusing circuit 33 which, as has already been stated, is controlled by the sequencer 342 (which stores the set of delay rules for each focusing zone and for each image line in its memory). It is to be noted that this modification can also be carried out in a different way (not shown), for example by providing an auxiliary circuit, referred to as a focusing correction circuit, just upstream or just downstream from the circuit 33, said auxiliary circuit also being programmable and also consisting of n delay lines which correspond to the n receiving and processing channels. If present, this focusing correction circuit, controlled by the memory circuit 55, is arranged upstream from the circuit 33 and receives the output signals of the circuit 32, the output signals of the circuit 33 constituting, as before, the output signals of the n receiving and processing channels which are applied to the summing device 41. Alternatively, it may also be arranged downstream from the circuit 33: it then receives the output signals and its n output signals constitute said output signals, applied to the summing device 41, of the n receiving and processing channels.

In accordance with the invention, as has already been stated, the reintroduction of the estimated delays stored in the memory circuit 55 into the receiving and processing channels does not take place during the next activation but immediately, for as long as the current activation has not yet been completed. To this end, the receiving and processing stage 300 comprises a circuit 57 for correction in the receiving mode, which circuit is formed by delay lines 57a to 57n which are connected in series in each of the respective receiving and processing channels, a supplementary connection being provided between the circuit 55 and said circuit 57.

In an alternative embodiment, this iterative correction process can be readily interrupted when said correction is deemed to be efficient and sufficient. This interruption can take place, for example either after a predetermined number of activations, or by applying of an interruption criterion. For example, interruption can take place when the energy of the echographic line reaches a predetermined threshold. To this end, it can be considered that this energy is maximum when focusing is correct in the transmission as well as in the receiving mode. An interruption control circuit (not shown but connected, for example upstream from the correlation stage 54) is then provided in order to realise this alternative and comprises on the one hand a circuit for calculating the energy of the echographic line whose input is connected to the output of the summing device 41 for this purpose, and on the other hand a circuit for calculating energies of the individual signals in order to obtain a normalized value of this energy, which circuits fetches, via n connections, the n signals present on the n inputs of this summing device. If $S_i(t)$ is the energy of the $i^{th}$ individual signal present on the $i^{th}$ input of the summing device 41, the normalized energy C of the echographic line is actually equal to the ratio of the energy of the line to n times the sum of the energies $S_a(t)$ to $S_n(t)$ of the individual signals (and is to be understood to be a value between 0 and 1). Actually, when a scattering object is examined, the value of C depends on the focusing and has been found to be, in the case of practical experiments, equal to at the most ⅔ if the transducer matrix is a linear matrix, and in the order of magnitude of 0.5 if it is a circular array. The interruption of the iterative process takes place when the value C reaches a predetermined threshold. A divider and a comparator (again not shown) execute said operations for calculating the ratio and the comparison with the threshold on the output of the two calculation circuits.

Figure 5:
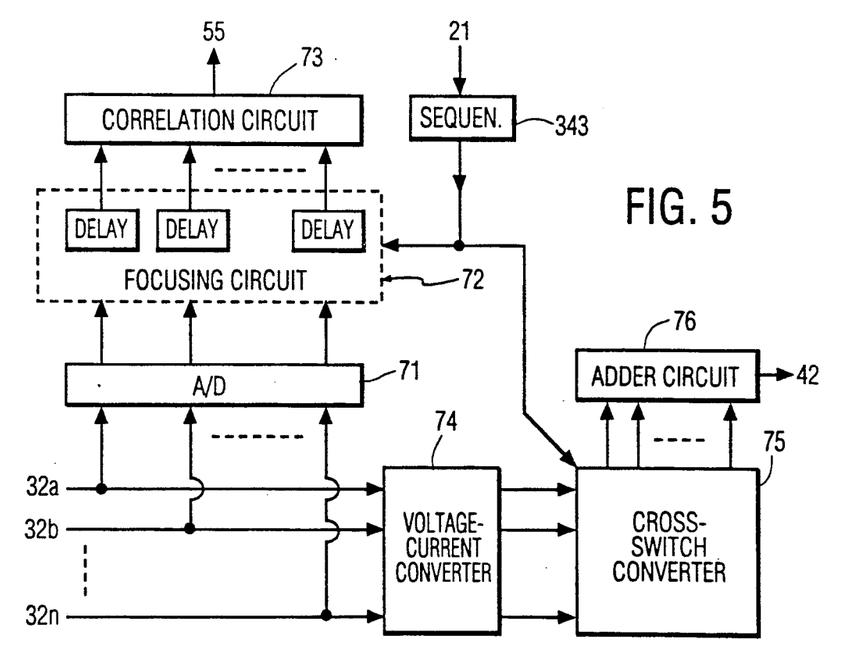
FIG. 5 shows an alternative embodiment with respect to FIG. 3 of the receiving and processing channels.

It is to be understood that the present invention is not limited to the embodiments described above; on the basis thereof other versions can be proposed without departing from the scope of the invention. For example, it is to be noted that the iterative correction in accordance with the invention by successive retrocoupling of information from the receiving and processing stage to the transmission stage or to the receiving and processing stage itself is achieved as well when the transmission and/or receiving channels are digital or analog. Actually, the receiving and processing channels are analog in FIG. 3, but they may also be digital as has already been stated, an analog-to-digital converter then being inserted in each of the channels in series, for example at the output of the circuit 32 for gain compensation as a function of time. This alternative is not shown, but can be readily deduced from FIG. 3. However, FIG. 5 shows, with reference to FIG. 3, another alternative embodiment of the receiving and processing channels. Actually, it is not indispensable to access each of the n delayed signals distinctly, so that architectures other than those described are feasible. As appears notably from FIG. 5, part of the channels is then digital and successively comprises an analog-to-digital conversion circuit 71, a circuit 72 for focusing in the receiving mode (these circuits 71 and 72 are 1-bit circuits in the present case, the circuit 71 converting the signal it delivers, for example an 8-bit signal, into a 1-bit signal, conserving only the sign bit), and a correlation circuit 73 which executes, as before, the determination of the delays to be stored and used for the correction, the remainder of the receiving and processing channels remaining analog, comprising successively a voltage-current converter 74, a cross-switch circuit 75, and an adder circuit 76 which consists of an analog line which directly adds the currents received. The sequencer 343 controls on the one hand the focusing circuit 72 and on the other hand the cross-switch circuit 75. The output of the circuit 76 is connected to the input of the subassembly 42.

I claim:

1. A method of examining an object by ultrasonic echography utilizing successively shifted ultrasonic apertures for acquiring echographic data for respective successive lines in an echograph of the object, comprising, for acquisition of each line, a transmitting step of transmitting ultrasonic signals from an array of m ultrasonic transducer elements to the object to be examined, and a receiving and processing step of receiving and processing echographic signals returned to said transducer elements by the object being examined, said transmitting step and said receiving and processing step comprising respective focusing by application of focusing delays to n channels associated with n of the transducer elements constituting a current ultrasonic aperture in accordance with a delay rule, said receiving and processing step further comprising a step, after said focussing, of correlating (n−1) different pairs of signals from the n channels in order to determine (n−1) focusing delay correction values, and said transmitting step including a shifting of the ultrasonic aperture by a number of p transducer elements, less than the number n, from a last ultrasonic aperture to the current ultrasonic aperture, wherein at least one of the transmitting step and the receiving and processing step include a step of correcting the focussing delays with said focussing delay values as constants applicable throughout acquisition of the data for a line corresponding to a current aperture, said step of correcting being of the focusing delays in only (n−p) of the n channels by applying only (n−p) of the (n−1) focusing delay correction values determined during the acquisition of data for the line corresponding to the last aperture to only the (n−p) channels common to the last and current ultrasonic apertures.

2. A method as claimed in claim 1 wherein the receiving and processing step also includes a timing operation for interrupting corrections according to a predetermined criterion.

3. A method as claimed in claim 2, wherein the receiving and processing step includes, prior to any correction by it of the focussing delays, an operation for detection of an anechoic zone in the object or the detection of a linear component in the focussing delays.

4. A method as claimed in claim 1, wherein when n=m, each shifting of the ultrasonic aperture is realized by modification of the delay rule applied to the channels.

5. A method as claimed in claim 4 wherein the receiving and processing step also includes a timing operation for interrupting corrections according to a predetermined criterion.

6. A method as claimed in claim 4, wherein the receiving and processing step includes, prior to any correction by it of the focussing delays, an operation for detection of an anechoic zone in the object or the detection of a linear component in the focussing delays.

7. A method as claimed in claim 1, wherein the receiving and processing step includes, prior to any correction by it of the focussing delays, an operation for detection of an anechoic zone in the object or the detection of a linear component in the focussing delays.

8. A method as claimed in claim 1, wherein p does not exceed 1/10 th of the number n.

9. A method as claimed in claim 1, wherein both said transmitting step and said receiving and processing step include said a step of correcting focusing delays in only (n−p) of the n channels.

10. An apparatus for examining an object by ultrasonic echography utilizing successively shifted ultrasonic apertures for acquiring data for respective successive lines in an echograph of the object, comprising an array of m ultrasonic transducer elements associated with a transmitting stage for transmitting ultrasonic signals to the object to be examined and with a receiving and processing stage for receiving and processing echographic signals returned to said transducer elements by the object being examined, said transmitting stage and said receiving and processing stage comprising respective means for focusing by application of focusing delays in n channels associated with n of said m transducer elements constituting a current ultrasonic aperture, said receiving and processing stage also comprising means for correlation of (n−1) different pairs of n signals associated with said n channels in order to determine (n−1) focusing delay correction values, and said transmission stage also comprising means for shifting the ultrasonic aperture across the array of transducer elements by a number p transducer elements, which is less than the number n, from a last aperture to the current aperture, wherein at least one of said receiving and processing stage and said transmission stage comprises means for correcting the focusing delays by applying only (n−p) of the focusing delay correction values determined during the acquisition of data for the line corresponding to the last aperture as constants throughout the acquisition of data for the line corresponding to the current aperture to the (n−p) channels common to the current and last apertures.

11. An apparatus as claimed in claim 10, wherein when n=m, said control stage comprises means for shifting said aperture by modification of the delay rule applied to said channels.

12. An apparatus as claimed in claim 11 including means for interrupting the correction as a function of a predetermined criterion.

13. An apparatus as claimed in claim 11, wherein p does not exceed 1/10 th of the number n.

14. An apparatus as claimed in claim 13 including means for interrupting the correction as a function of a predetermined criterion.

15. An apparatus as claimed in claim 11, wherein both said transmitting step and said receiving and processing step include said a step of correcting focusing delays in only (n−p) of the n channels.

* * * * *